United States Patent [19]

Hamelin

[11] Patent Number: 5,590,929
[45] Date of Patent: Jan. 7, 1997

[54] LOCKING SYSTEM FOR A DEVICE ADJUSTABLE BY TRANSLATIONAL MOTION, SUCH AS A HEADREST

[75] Inventor: Bruno Hamelin, Combs La Ville, France

[73] Assignee: Bertrand Faure Equipements S.A., Boulogne, France

[21] Appl. No.: 490,736

[22] Filed: Jun. 15, 1995

[30] Foreign Application Priority Data

Jun. 16, 1994 [FR] France .................................. 94 07554

[51] Int. Cl.$^6$ ........................................................ B60N 2/42
[52] U.S. Cl. ........................................ 297/216.12; 297/410
[58] Field of Search ........................................ 297/410, 391, 297/216.12

[56] References Cited

U.S. PATENT DOCUMENTS

| | | | |
|---|---|---|---|
| 3,512,832 | 5/1970 | Kage | 297/410 |
| 3,542,429 | 11/1970 | Inoue et al. | |
| 4,639,039 | 1/1987 | Donovan | 297/410 X |
| 4,844,545 | 7/1989 | Ishii | 297/410 |
| 4,976,493 | 12/1990 | Frankila | 297/410 |
| 5,156,440 | 10/1992 | Vidwans | 297/410 |

FOREIGN PATENT DOCUMENTS

| | | |
|---|---|---|
| 268383 | 7/1993 | France . |
| 2708461 | 8/1978 | Germany . |
| 2948537 | 6/1981 | Germany . |
| 3131633 | 2/1983 | Germany . |
| 2069584 | 8/1981 | United Kingdom . |
| 2106380 | 4/1983 | United Kingdom . |

*Primary Examiner*—Milton Nelson, Jr.
*Attorney, Agent, or Firm*—Pollock, Vande Sande & Priddy

[57] ABSTRACT

A vertically adjustable vehicle headrest has at least one slider translationally mounted in a guide. The slider has a plurality of locking notches regularly spaced along its length and a bistable headrest locking system is provided that includes a movably mounted cam that normally rests in a stable unlocked position relative to the notches thus allowing adjustable translational displacement of the slider relative to the guide. The cam is alternately movable to a stable locked position relative to the notches thus inhibiting translational displacement of the slider relative to the guide. A spring is mounted at a first end to a stationary member and at a second end to the cam for maintaining the cam in one of two bistable positions, namely, in a stable locked position or a stable unlocked position. The resilient device overcomes a biasing force when in the stable unlocked position and in response to rear impact to a vehicle that causes displacement of the cam to the stable locked position.

7 Claims, 3 Drawing Sheets

LOCKING SYSTEM FOR A DEVICE ADJUSTABLE BY TRANSLATIONAL MOTION, SUCH AS A HEADREST

FIELD OF THE INVENTION

The present invention concerns an adjustable system for locking headrest on automobile for a seat of an automotive vehicle, or another device whereof the position can be adjusted by translational motion and which must be maintained solidly in any pre-set position in the course of particular circumstances, for example when the device undergoes shock, while preserving great ease concerning the adjustment in place.

BACKGROUND OF THE INVENTION

In the special case of the headrests, known systems for regulating their height comprise two spindles which are connected to the headrest and which are slidable in respective bores of a supporting piece or sheath fastened to the back part of the seat. Keeping the headrest in a given position, which has been chosen by the user, is classically achieved with the help of an indexing system one to keep the headrest in the set position and to modify this position by a simple voluntary action upon the headrest, in the upward or in the downward direction.

This indexing system is constituted by a succession of notches or recesses which are created on the spindles and into which are inserted elastic blocking means which are fitted together with the sheath. The notches, which usually have a cross section of a triangular profile, are as a rule unlocking by nature, that is to say that a mere vertical action on the headrest is sufficient to push back the elastic blocking means and to slide the spindles to another position where the blocking means insert themselves into another notch.

In a number of cases, particularly at the moment of impact from the rear on a vehicle equipped with these headrests, the strain exerted by the head of the user onto the headrest is liable to attain about one hundred kilograms (1000 N) with a vertical component of about 25 kg (250 N). Such a load is sufficient to unlock the indexing system and to bring about a lowering of the headrest, this being dangerous for the user whose head is no longer correctly supported and can swing backwards with the concomitant risks of injury for the cervical vertebra.

In order to avoid this problem, it has already been suggested to configure the notches of the spindles with an unsymmetrical cross section, in such a manner that the locking is positive in the downward direction, in other words it prevents a downward sliding of the spindle, even in the case of an important load, while nevertheless preserving the function of the self-unlocking during an upward sliding. In order to lower the headrest, it is then required to unlock it by acting upon the elastic blocking means, through the intermediary of an adapted pushing device, and to hold them in the unlocked position while one is lowering the headrest. This handling is thus rather impractical since it requires the use of the two hands, one for maintaining the pushing device and the other for operating the sliding of the headrest, and this operation is practically impossible, or very dangerous to be executed by the driver of a car while he is driving.

BRIEF DESCRIPTION OF THE INVENTION

The present invention aims to solve the problems set forth above, and it has particularly as its aim to allow the adjustment of a device such as a headrest, towards a lower or towards a higher position, with the help of one single hand acting on the headrest, while providing a secure locking in the set position in the case where an important vertical downward strength is exerted on the headrest, as a result of an impact, particularly of an impact from the rear against the vehicle.

With these objectives in mind, the invention concerns a locking system for a device which can be adjusted by a translational motion, such as a headrest comprising a guide and a slider that are movable one with respect to the other according to a shifting direction, characterized in that the slider (respectively the guide) comprises a series of notches spaced out along the shifting direction, and the guide (respectively the slider) comprises bistable locking means, including:

a locking member which is suitable to cooperate with the said notches and which can be moved between a stable unlocked position, wherein the locking member is uncoupled from the said notches, and a stable locked position, wherein the locking member cooperates with the notches in order to avoid a relative dislacement of the slider and of the guide in a first shifting direction, and resilient maintaining means designed so as to maintain the said locking member alternately in the locked position or in the unlocked position, the said locking means being designed in such a manner that the locking member can change its position by inertia, from the unlocked position to the locked position, under the influence of a shock undergone by the device.

Thanks to the invention the device shows, at the time of its current utilization, a great ease of adjustment, the locking means being maintained in the unlocked position and having consequently no effect upon the adjustment which can be operated just as if the locking means were absent. However, in the case of an impact, particularly in a direction which is transverse to the direction of the relative displacement of the slider and of the guide, the locking member changes its position automatically by inertia towards its locked position and blocks the slider on the guide, and it remains thereafter in this position until a positive action is exerted on the locking member in order to bring it back in its unlocked position.

Preferably, the locking member and the notches are formed into such shapes that a relative displacement of the slider with respect to the guide in a direction opposite to the said first direction of shifting, induces the transition of the blocking member from the locked position to the unlocked position.

According to a particular arrangement, the notches show, on the side intended to cooperate with the locking member in order to avoid the said relative displacement in the first direction, a flank which is substantially orthogonal to the direction of the shifting, and, on the other side, a flank which is inclined with respect to this direction, in a manner allowing to repel the locking member towards its unlocked position beyond its position of the unstable equilibrium located between its two stable positions, when the slider is shifted with respect to the guide in the direction opposite to the said first direction of shifting. It is then the relative movement of the slider with respect to the guide, in the direction opposite to that one for which the locking has been achieved, which constitutes the positive unlocking action.

It is then sufficient to execute this displacement which results in making the locking member return to its unlocked position, so as to render to the device its entire ease of adjustment in the two shifting directions.

Other characteristics and advantages of the invention will become apparent from the description that will be given here below, as a mere example of a locking system according to the invention, of a headrest for a seat of an automotive vehicle. Reference will be made to the drawings joined hereto, wherein:

BRIEF DESCRIPTION OF THE FIGURES the FIG. 1 is a general view of a headrest and of the system for its fastening to the back of the seat, the FIG. 2 is a view of a detail of the locking system, in its locked position, the FIG. 3 is a similar view, in an unlocked position, the FIG. 4 is a sectional view along the line IV—IV of the FIG. 1, the FIG. 5 is a sectional view along the line V—V of the FIG. 1, the FIG. 6 is a sectional view along the line VI—VI of the FIG. 1.

DETAILED DESCRIPTION OF THE INVENTION

Figure 1:
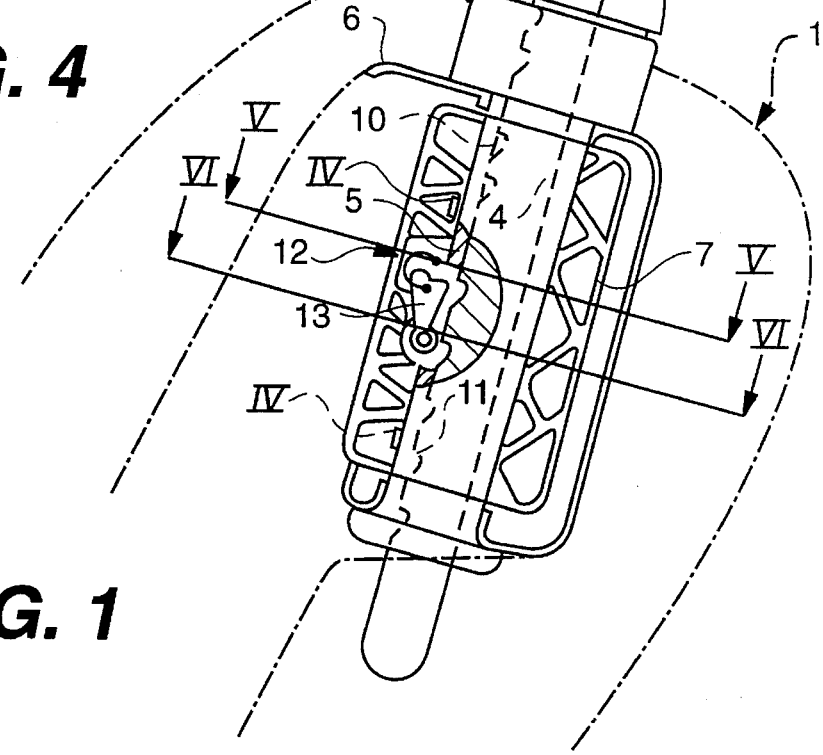

The drawing shown by FIG. 1 represents the upper part of the back of a seat 1 which is equipped with a headrest 2.

The headrest 2 is mounted on the back of the seat 1, so as to be able to slide in a substantially vertical direction F, the assembling being achieved with the help of two spindles 3 constituting sliders, each one being inserted in a bore 4 of a sheath 5 which is acting as a guide for the spindle 3 and which is fastened to the frame 6 of the back of the seat 1.

The sheath 5, generally made of a plastic material, is provided with stiffeners 7 and comprises in its upper part an indexing system 8 of a conventional type, allowing to maintain the headrest in an adjustable position selected by the user. This indexing system comprises, in a known manner, elastic blocking means 9 which fit into the transversal recesses 10 provided on the spindle 3. Each recess defines an adjusting position into which the headrest can be placed and maintained. The shape of these recesses, of a generally triangular profile, is such that a relatively weak effort acting on the headrest, in the upward or in the downward direction, is sufficient to repel the blocking means and to move the headrest into another adjusting position, according to the choice of the user.

According to the invention the spindle 3 also comprises a succession of notches 11, worked into the spindle, below the series of recesses. The pitch of the notches 11 is the same as the pitch of the recesses 10. Together with the bistable locking means, including a locking member and a spring which will be described later on, the notches 11 constitute a locking system for the headrest intended to avoid the latter from moving downwards under the effect of a vertical force, superior to that one required for the usual adjusting of the headrest, this vertical force being brought about by the head of the user in the case of an impact, especially from behind.

Figure 2:
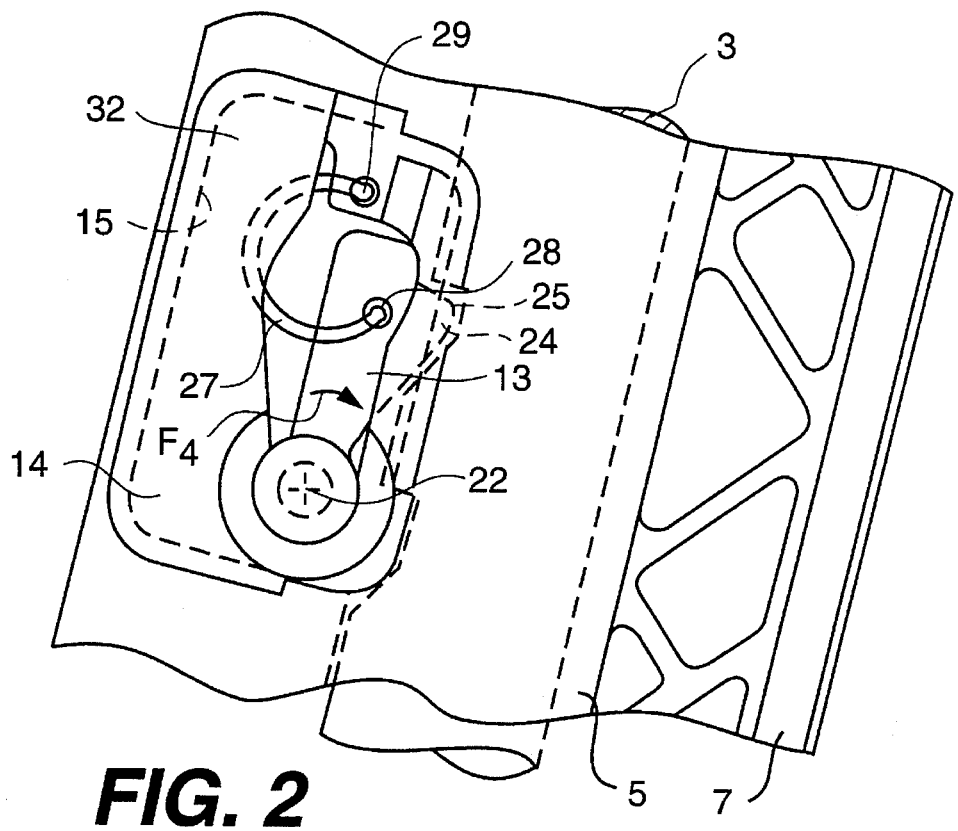
Figure 3:
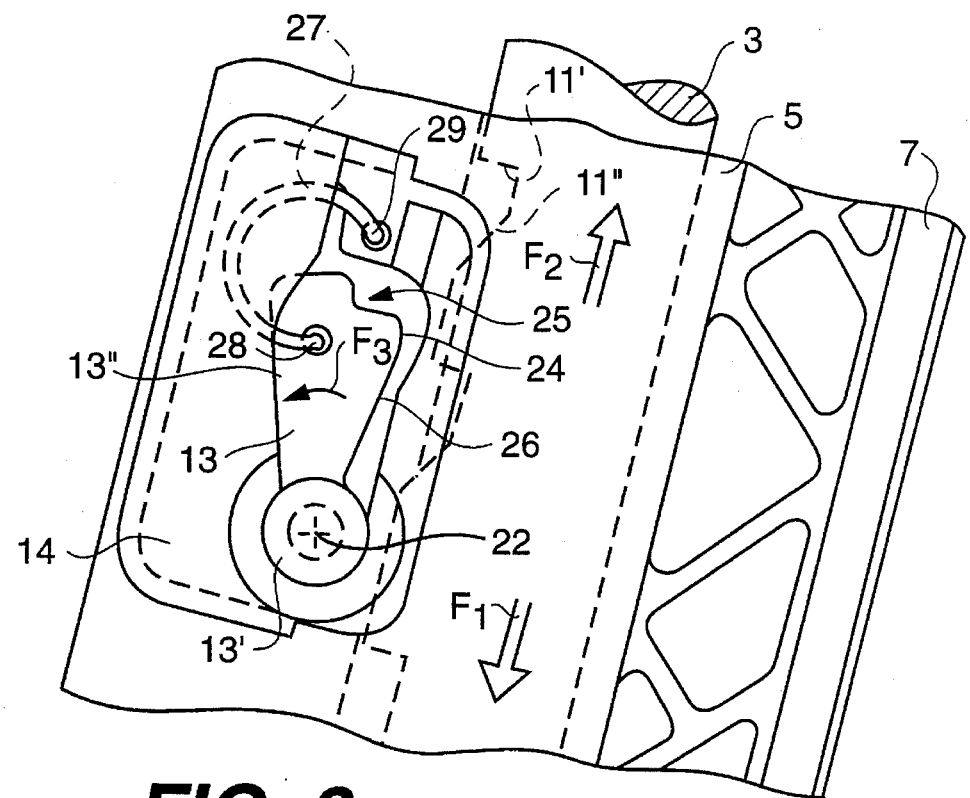
Figure 5:
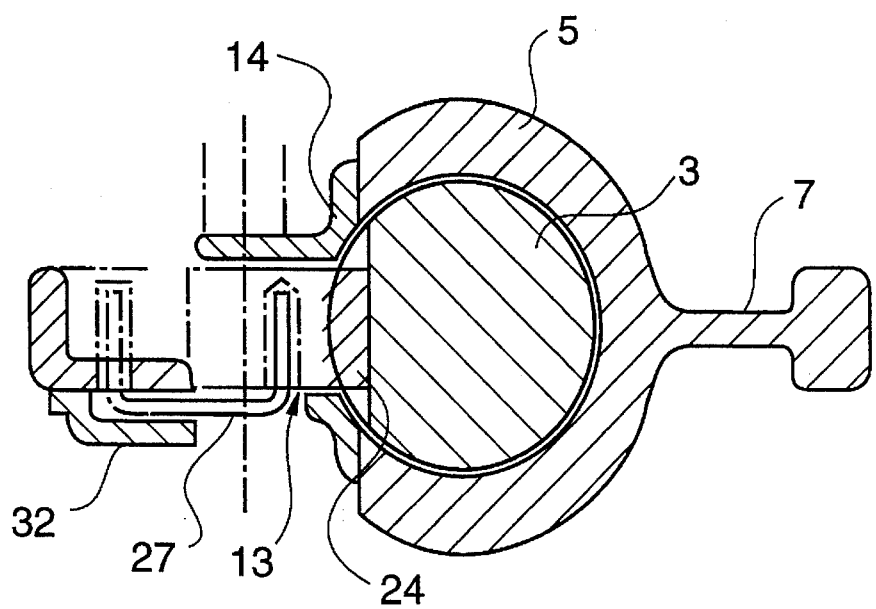
Figure 6:
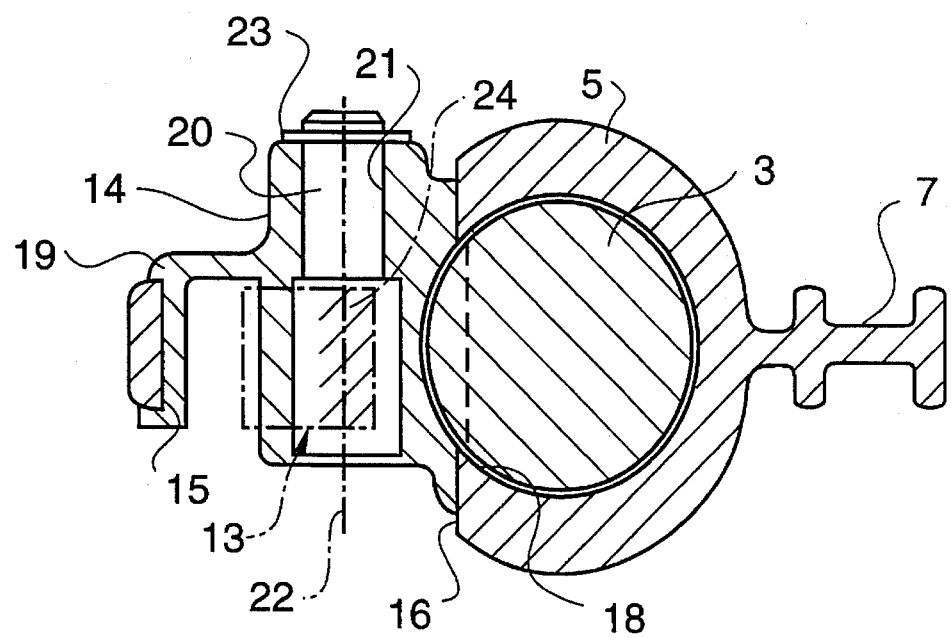

To face this effect, the notches 11 show, in the upward direction, a flank 11' (FIG. 3) which is substantially perpendicular to the direction of displacement F1–F2 (FIGS. 2 and 3). Moreover, the lower flank 11" of the notches is sloped with respect to that direction in order to constitute a ramp liable to push the locking member back towards its unlocked position, as will be better understood later on.

Figure 4:
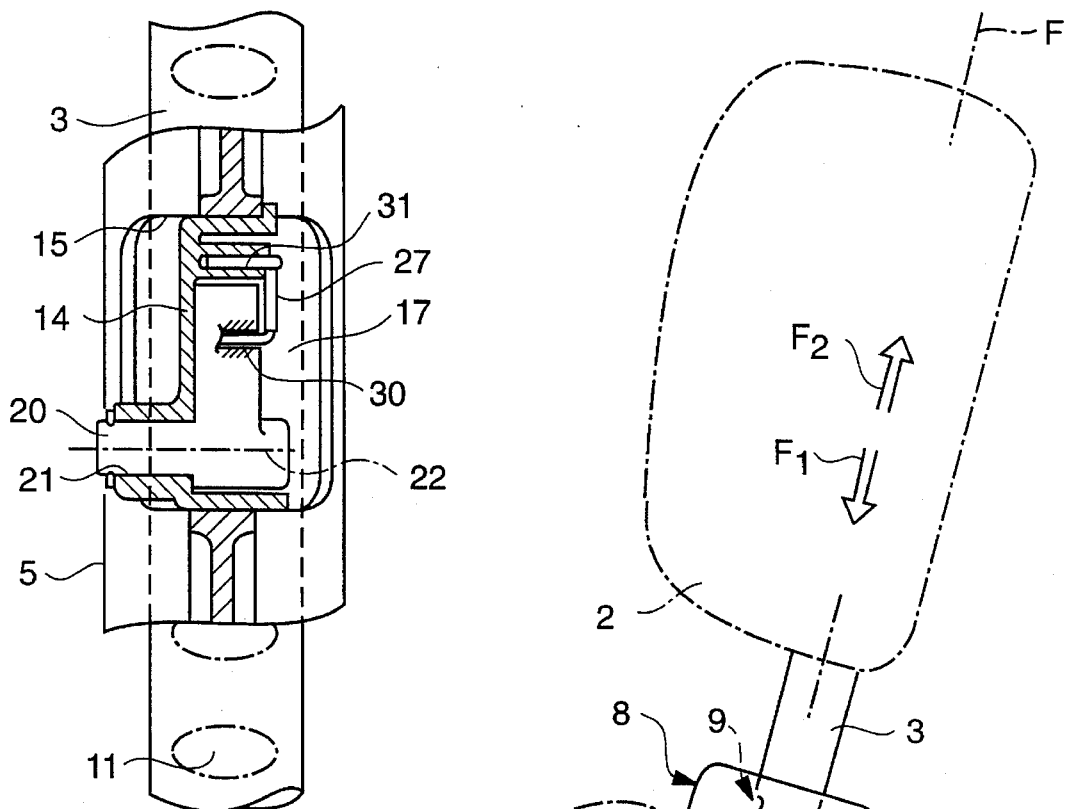

The bistable locking means 12 comprise a locking member constituted by a swivelling cam 13. As can be seen on the FIGS. 2 to 6, the cam 13 is mounted in a rotating manner in a casing 14 inserted in a housing 15 arranged to this end in the sheath 5 constituting the guide. One side of the housing 15 is constituted by a flat surface 16 realized on the sheath 5, which creates in the latter a window 17 (FIG. 4) opening into the bore 4 (FIG. 1), through which the cam 13 can enter into the notches 11. On its face in contact with the flat surface 16, the casing 14 comprises an undercut 18 whereof the surface reconstitutes, in the upper and in the lower part of the casing, the part of the bore suppressed by the achievement of the flat surface 16. Thus, as soon as the spindle 3 is put into position, the casing 14 cannot any longer come out of its housing, wherein it is maintained moreover by a clip 19.

The cam 13 comprises, towards its end 13' and located on the lower side, a shaft 20 inserted into a boring 21 of the casing, wherein it is freely journalled around a rotating axis 22 which is perpendicular to the displacement direction F1–F2 of the spindle. A conventional stop motion device, such a circlip 23 mounted on the shaft 20, prevents the cam from moving laterally.

Towards its upper end 13", the cam 13 comprises a tooth 24. The cross section of the latter is adapted to cooperate one of the notches 11, that is to say it presents an upper face 25 which is substantially perpendicular to the displacement direction F1–F2 in order to assure, in the locking position (FIG. 2), a reliable blocking of the spindle 3, the upper flank 11' of the said notches abutting against the upper face 25 of the tooth 24.

The lower face 26 of the tooth 24 shows an inclination corresponding to that one of the lower flank 11" of the notches 11, so that a displacement of the spindle 3 in the upward direction (arrow F2) pushes the cam 13 out of the notch 11, against the strain exerted on this cam by an elastic holding means, such as a spring 27 having an $\Omega$ (omega) shape.

The spring has an end 28 linked to the cam 13 in its upper part 13", and its other end 29 is linked to the casing 14.

The respective position of the ends 28, 29 of the spring 27 and of the rotating axis 22 of the cam 13 is such that in the locking position, represented in the FIG. 2, the end 28 of the spring linked to the cam is located, with respect to the straight line going through the end 29 of the spring and through the axis 22, on the side of the spindle 3, and in the locked position, represented by the FIG. 3, the end 28 of the spring is located on the other side of this straight line. In the shown example, where the two ends of the spring are located on the same side with respect to the axis 12, the spring 27 acts under compression, and tends to push back the cam 13 either in a stable locked position or in a stable unlocked position on either side of the position of the unstable equilibrium where the ends of the spring and the axis 22 are on the same line, and where the ends 28 and 29 of the spring are closest one to the other. The omega shaped spring can be replaced by another kind of compression spring. A tension spring could also be used to fulfil the same function,-in which case the ends would be located on either side of the axis 22. Other elastic holding means could also be used in conjunction with an adapted configuration of the cam 13, according to arrangements known to the skilled workmen, in order to achieve a bistable cam-spring system.

Whatever the used system, the relative arrangement of the cam and of the spring must be such that the locked position constitutes a stable position just as does the unlocked position. Moreover the shapes and the dimensions of the cam 13 and of the tooth 24 are such that the cam is pushed back beyond its position of unstable equilibrium when the pivoting of the cam 13 into the direction of the unlocking (arrow F3 in FIG. 3) results from the action of the flank 11" of the notches 11 on the tooth 24 during an upward movement (arrow F2) of the spindle 3. Thus the mere displacement in this direction of the spindle 3 is sufficient to replace the cam 13 into its stable unlocking position where it is maintained until an impact induces on the cam a rotation force, which tends to make it rotate in the direction (arrow F4) opposite to that one of the arrow F3 and which is sufficient to overcome the deformation strain to which the spring 27 is submitted when it is located in its position of unstable equilibrium. To this effect the mass of the cam, the stiffness of the spring, their dimensions and relative positions are defined as a function of the energy of the impact, consequently of the acceleration undergone by the device, under which the cam must swing into its locking position in order to avoid the lowering of the headrest.

On the contrary, as long as the cam remains in its stable unlocked position, the headrest can be adjusted just as well in the upward direction as in the downward direction by moving it with just one hand, and by having the advantage of the conventional indexing system 8.

It will be taken notice of the fact that the pitch of the notches 11 is equal to that one of the recesses 10 and that their relative position is such that a notch is placed opposite to the tooth 24 of the cam when the headrest is in any indexed position so that, whatever the position of the adjustment, the cam can transit into the locking position.

According to a preferred arrangement, the omega shaped spring 27 comprises at each end 28, 29 a fastening hook 30, 31 oriented perpendicularly to the general plane of the spring, each hook being inserted in a corresponding hole, respectively of the cam and of the casing, and a maintaining plate 32 is arranged in parallel to the said plane of the spring, so as to overlap at least partially the spring, in order to prevent the said hooks to be released from their holes.

This arrangement greatly facilitates the setting of the spring during the mounting, and the plate 32, which is preferably a part having been moulded together with the casing 14, guarantees that the spring is kept in its position.

The invention is not limited to the device which has been disclosed herebefore as an example only. More particularly, the casing 14 could be executed in one single piece together with the sheath 5. Moreover, the bistable locking system could for example comprise, instead of the pivoting cam 13, a sliding latch which can be moved by a translational motion perpendicularly to the shifting direction F and which is guided within the sheath 5.

In other embodiments, the notches could also be foreseen on the guide and the bistable system constituted by the spring and by the locking member could be mounted on the slider.

I claim:

1. In a vehicle headrest that is vertically adjustable and having at least one slider translationally mounted in a guide, a bistable headrest locking system comprising:

plurality of locking notches regularly spaced along the length of the slider;

a movably mounted locking means for normally resting in a stable unlocked position relative to the notches thus allowing adjustable translational displacement of the slider relative to the guide, and movable to a stable locked position relative to the notches thus inhibiting translational displacement of the slider relative to the guide;

resilient means mounted at a first end to a stationary member and at a second end to the locking means for maintaining the locking means in one of two bistable positions, namely, in a stable locked position or a stable unlocked position;

the resilient means overcoming a biasing force when in the stable unlocked position in response to rear impact to a vehicle and causing displacement of the locking means to the stable locked position.

2. The combination set forth in claim 1 wherein surfaces of the locking means cam against surfaces of the notches thereby displacing the locking means from a stable locked position to a stable unlocked position in response to vertically upward slider displacement.

3. The combination of claim 2 wherein the notches further have a first surface orthogonal to the direction of vertical slider displacement, and a second surface inclined to the direction of vertical slider displacement.

4. The combination of claim 1 wherein the locking means is a cam pivotally mounted within the guide.

5. The combination of claim 1 wherein the resilient means is an omega shaped spring having a first end connected within the guide, and a second end connected to the locking means.

6. The combination of claim 5 wherein each end of the spring comprises a fastening hook oriented perpendicularly to the plane of the spring, each fastening hook being inserted in an opening within the guide and locking means, respectively; and further wherein a plate member overlaps the spring to retain the hooks within the openings.

7. The combination of claim 1 wherein the slider further includes a plurality of indexing notches for receiving mating elastic means extending from the interior of the headrest guide thereby acting as a detent for releasably maintaining the slider in a preselected vertical position while the locking means is in a stable unlocked position, the indexing notches having the same pitch as the locking notches.

* * * * *